(12) United States Patent
Dunger

(10) Patent No.: US 6,431,624 B1
(45) Date of Patent: Aug. 13, 2002

(54) SUCTION GRIPPER

(75) Inventor: Matthias Dunger, Erlbach (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 31 days.

(21) Appl. No.: 09/642,436

(22) Filed: Aug. 21, 2000

(30) Foreign Application Priority Data

Aug. 21, 1999 (DE) .......................................... 199 39 792

(51) Int. Cl.[7] ................................................. B25J 15/06
(52) U.S. Cl. ..................................................... 294/64.1
(58) Field of Search ........................... 294/64.1, 65, 88; 269/21; 271/90, 94, 102, 103, 107, 108; 414/737, 752.1; 901/40

(56) References Cited

U.S. PATENT DOCUMENTS

| | | | | |
|---|---|---|---|---|
| 1,717,454 A | * | 6/1929 | Kelly | .......................... 271/103 |
| 4,189,137 A | * | 2/1980 | Denney et al. | ......... 294/64.1 X |
| 4,624,456 A | * | 11/1986 | Porat | .......................... 271/103 |
| 4,640,503 A | * | 2/1987 | Naumann | ................... 271/103 |
| 5,113,578 A | * | 5/1992 | Jackson et al. | ........ 294/64.1 X |
| 5,451,086 A | | 9/1995 | Pazzaglia | |

FOREIGN PATENT DOCUMENTS

| | | |
|---|---|---|
| DE | 30 16 346 | 1/1981 |
| DE | 37 24 878 A1 | 2/1989 |
| DE | 43 24 552 | 1/1995 |
| DE | 198 17 777 C1 | 9/1999 |
| GB | 316 501 | 8/1929 |
| GB | 865 376 | 4/1961 |
| GB | 1 322 856 | 7/1973 |
| GB | 2 226 548 | 7/1990 |

* cited by examiner

*Primary Examiner*—Johnny D. Cherry
(74) *Attorney, Agent, or Firm*—Cohen, Pontani, Lieberman & Pavane

(57) ABSTRACT

A suction gripper is provided having a cylinder and a piston for executing a suction stroke having a first and a second stroke position. A cylinder housing with a cylinder space is provided, which at one end has an orifice to atmospheric pressure, against which the cylinder space is sealed off by means of the piston pre-stressed by a compression spring. A piston rod projects from the other end of the cylinder space for executing a stroke. The cylinder space has a constant connection to a vacuum duct via a first passage bore in the cylinder housing. The piston rod has a central bore in the projecting end. The central bore can be connected in its interior to the vacuum duct via a radial bore in the piston rod and a second passage bore in the central housing. At the projecting end of the piston rod, the central bore is closed by means of a suction element in order to suction a component. In the first stroke position, the piston bears against the orifice and the radial bore is closed by the cylinder housing, so that there is no connection to the vacuum duct. In the second stroke position, the piston is displaced by a vacuum being applied to the cylinder space, so that the radial bore is connected to the second passage bore and a vacuum is applied at the central bore.

5 Claims, 4 Drawing Sheets

SUCTION GRIPPER

BACKGROUND OF THE INVENTION

1. Field of the Invention

The present invention relates to an exclusively vacuum-operated suction gripper for use in building machines. The invention can be used wherever, under restricted conditions of space, small articles are to be extracted from a machine and transported. More specifically, the present invention is a suction stroke cylinder.

2. Description of the Related Art

It is known to use vacuum-operated suction grippers to suction up and move small articles during production of various machines and the like. For this purpose, in addition to the suction elements, it is also necessary to have pressure elements to operate the feed movement or the stroke movement of the suction elements. As a result, the suction gripper sometimes becomes too large for many applications.

SUMMARY OF THE INVENTION

The object of the present invention is to provide a suction gripper that makes it possible to transport very small components in a very restricted space.

The suction gripper according to the present invention has a cylinder and a piston for executing a suction stroke having a first and a second stroke position. A cylinder housing with a cylinder space is provided, which, at one end, has an orifice to atmospheric pressure, against which the cylinder space is sealed off by means of the piston prestressed by a compression spring. A piston rod projects from the other end of the cylinder space for executing a stroke. The cylinder space has a constant connection to a vacuum duct via a first passage bore in the cylinder housing. The piston rod has a central bore, in the projecting end. The central bore can be connected in its interior to the vacuum duct via a radial bore in the piston rod and a second passage bore in the cylinder housing. At the projecting end of the piston rod, the central bore is closed by means of a suction or sucking element in order to suction a component. In the first stroke position, the piston bears against the orifice and the radial bore is closed by the cylinder housing, so that there is no connection to the vacuum duct. In the second stroke position, the piston is displaced by a vacuum being applied to the cylinder space, so that the radial bore is connected to the second passage bore and a vacuum is applied at the central bore.

In order to trigger the valve function between the stroke of the suction gripper and suctioning the component, the vacuum is applied to the central bore in the piston rod via a control edge at the second passage bore in the cylinder housing.

The advantage of this suction gripper is its small construction dimensions. These are obtained primarily because the same vacuum source is used both for the stroke and for suctioning the article to be moved. The two operations, in this case, are executed automatically in succession after only one switching signal.

In one embodiment of the suction gripper, the vacuum duct is located in the wall of the cylinder housing which is then connected to the vacuum source.

It is also possible, however, for the cylinder housing to be arranged in a transport device and for the vacuum duct to be located in this transport device.

If one or more components are to be moved by suction grippers in a manufacturing plant, in order to transport them to a further processing station, the suction gripper is brought into a position opposite the article to be suctioned and a switching signal is triggered. At the same time, a vacuum is introduced into the cylinder space via the vacuum duct. As a result of the pressure difference between the atmospheric pressure, the pressure on the outside of the piston and the relative or partial vacuum in the cylinder space, the piston is drawn towards the compression spring. The piston rod, together with the sucking element, is pressed onto the article to be moved. Shortly before the piston rod reaches the end of the stroke, a valve function comes into force. The radial bore reaches a control edge at the second passage bore in the cylinder housing and a vacuum is introduced into the central bore of the piston rod. The vacuum causes the sealing edge on the suction element to be applied firmly to the article to be moved. In this position, the article to be moved can be transported to another processing station. Here, the article is brought into the necessary position and the vacuum is switched off by means of a renewed switching signal. The pressure in the cylinder space rises and the piston rod slides back into the cylinder housing. The central bore in the piston rod is thereby separated from the vacuum and the suction element comes loose from the article to be moved. This operation can be accelerated if a brief blowing pulse is applied to the vacuum duct.

A suction gripper is thus provided, which can also be used for transporting small components in special machines and fixed-cycle lines. The essential advantages of the suction gripper according to the present invention arise from the small compact design, the application of only one form of energy and the supply of only one switching signal both for the stroke and for the sucking up.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is described in detail below with reference to the accompanying drawings in schematic form wherein the same reference numerals designate identical or similar parts in the individual drawings.

DETAILED DESCRIPTION OF THE PRESENTLY PREFERRED EMBODIMENTS

Figure 1:
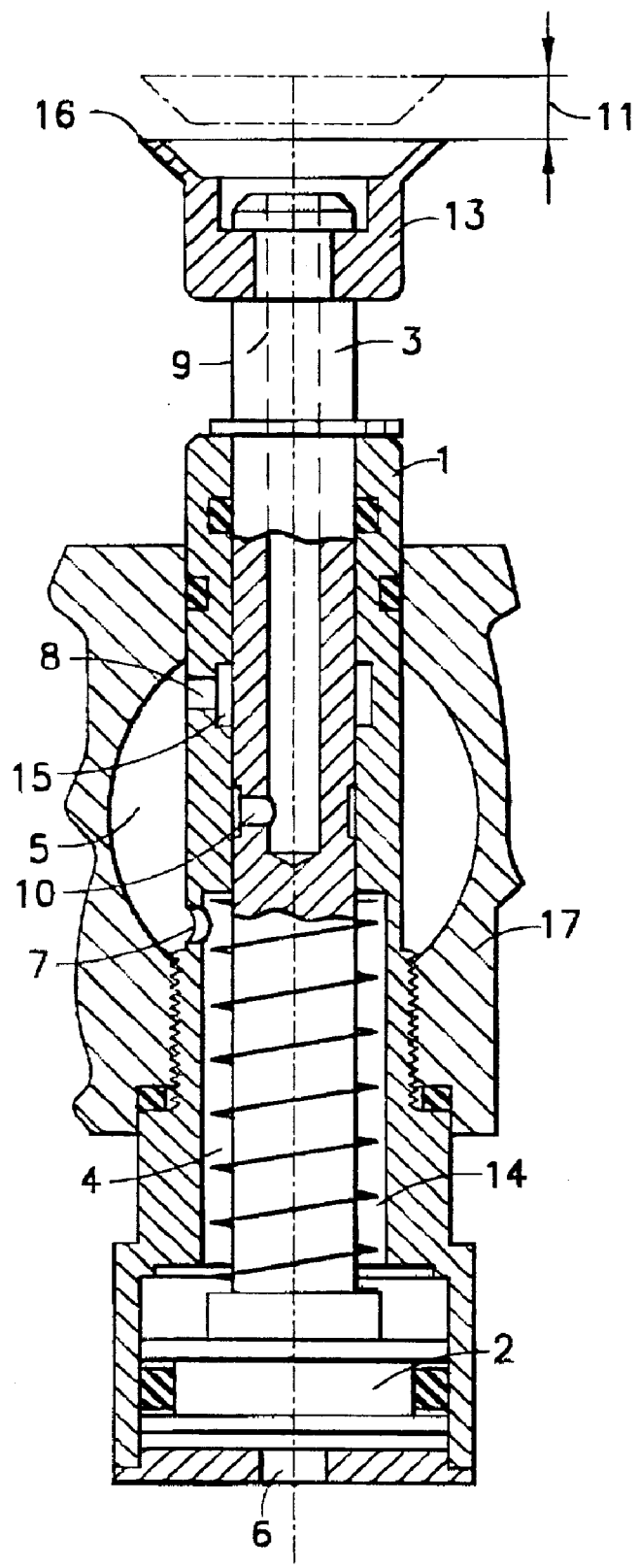
FIG. 1 is a suction gripper according to the present invention in the released position.

Referring now to FIG. 1, the basic make-up of the suction gripper according to the present invention is illustrated. A cylinder space 4 for a vacuum is located in a cylinder housing 1 and is sealed off on one side by means of a piston rod 3 projecting from the cylinder housing 1. At the other end, the cylinder housing 1 possesses an orifice 6 which forms a connection to the atmosphere. At this end, the cylinder space 4 for the vacuum is sealed off by means of the piston 2 located on the piston rod 3. A suction element 13 is fastened to the end of the piston rod 3 which projects from the cylinder housing 1 on the projection end. Inside the cylinder housing 1 is a compression spring 14 which presses the piston 2 against the orifice 6 when the suction gripper is in the released state. The cylinder housing 1 is screwed into a transport device 17, in which a vacuum duct 5 is located. Two axially offset passage bores 7, 8 terminate in the cylinder housing 1. One passage bore 7 leads to the cylinder space 4 and is constantly connected to the cylinder space 4. The piston rod 3 has a central bore 9 open towards the suction element 13 and a radial bore 10 which, during the movement of the piston rod 3 in the second stroke position, is connected to the passage bore 8 in the cylinder housing 1.

Figure 2:
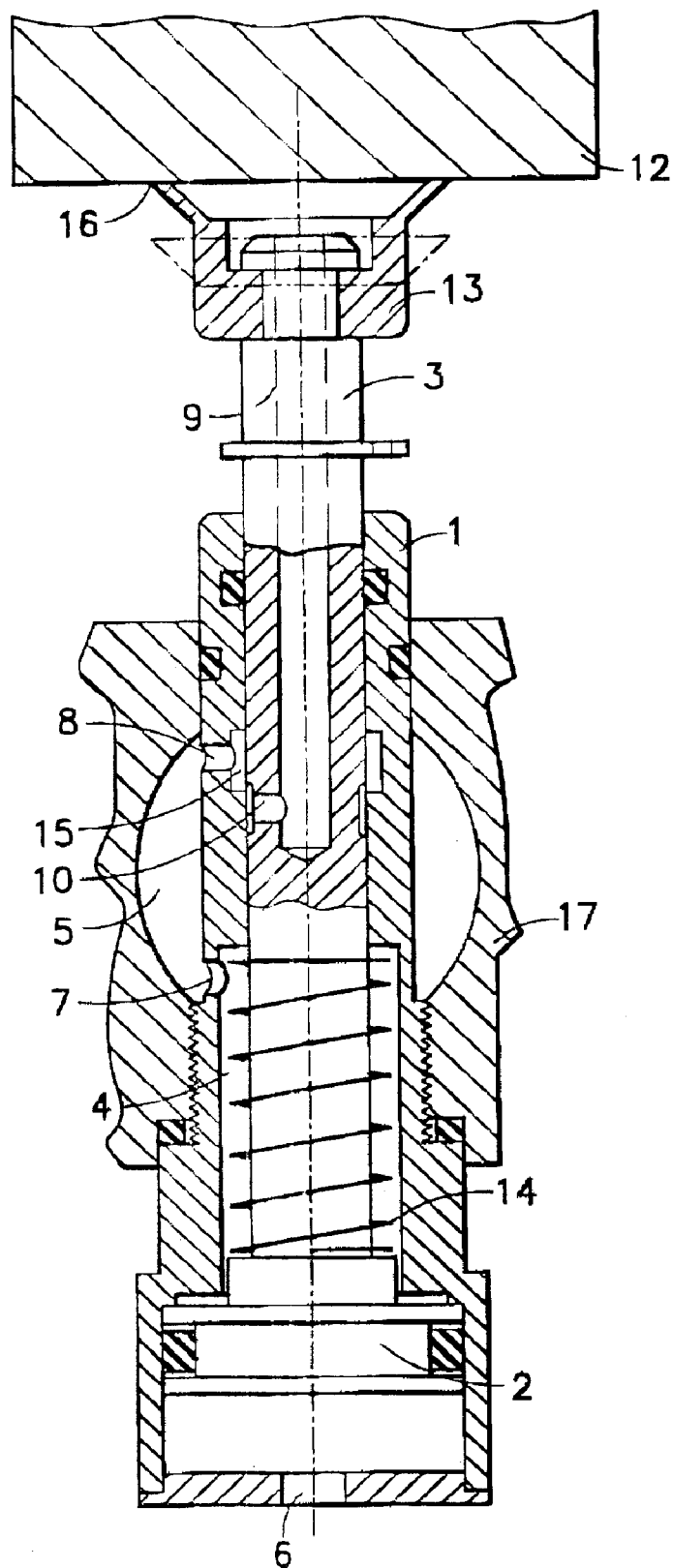
FIG. 2 is a suction gripper according to the present invention in the suctioned position.

Referring now to FIG. 2, the suction gripper according to the present invention is shown in the position in which an article 12 to be moved is suctioned. In this position of the piston rod 3, the suction element 13 and the central bore 9 of the piston rod 3 are connected to the vacuum duct 5 via the radial bore 10 and the passage bore 8 in the cylinder housing 1. The vacuum for the stroke movement of the piston rod 3 is used simultaneously for suctioning the article or component 12 to be moved.

Figure 3:
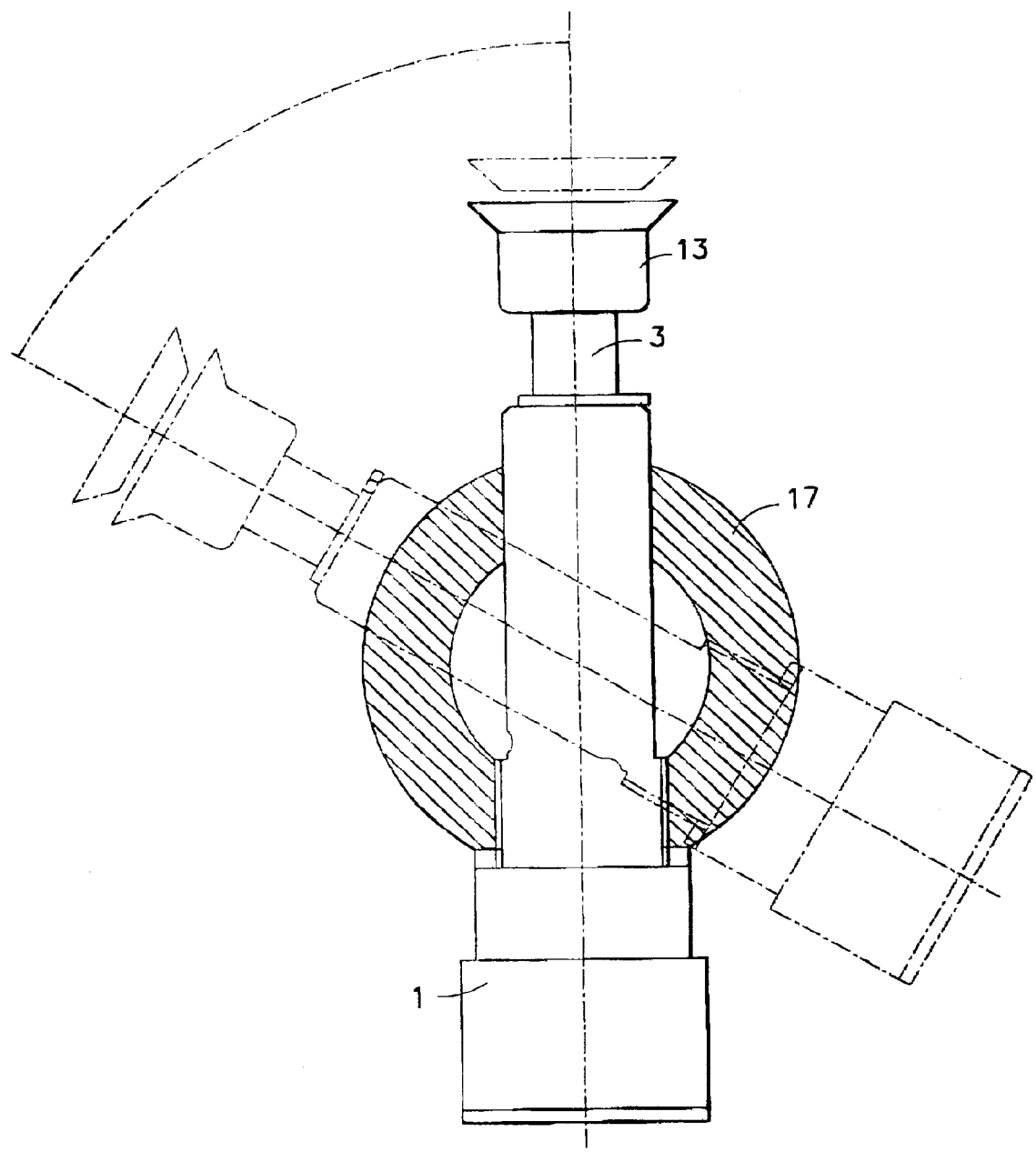
FIG. 3 is a suction gripper according to the present invention in the transport position.

Referring now to FIG. 3, a pivoting movement of the transport device 17 is shown which may be provided for transporting the component 12. It is also possible, however, to use a transport device 17, by means of which the suction gripper is suitably guided into a rectilinear, up or down movement or the like.

In order to suction the article 12 to be moved, a vacuum is applied to the vacuum duct 5. The vacuum is led into the cylinder space through the bore 7, with the result that the piston 2 is moved towards the compression spring 14 as a result of the pressure difference in relation to atmospheric pressure, so that the piston rod 3 is pressed out of the cylinder housing 1. Shortly before the end of the stroke is reached, a valve function is triggered by a control edge 15 at the second passage bore 8. In this position, the second passage bore 8 is connected to the central bore 9 in the piston rod 3 via the radial bore 10. The vacuum is thereby applied to the suction element 13. The suction element 13, which in this position grasps the component 12 to be moved, is evacuated, and the component 12 to be moved adheres to the suction element 13 via a sealing edge 16. The valve function prevents the inflow of air before the sealing edge 16 is applied to the component 12. As a result, the output of volumetric vacuum flow is kept low, in contrast to known suction cylinders which are designed specially for porous substances and which operate via throttles. The suction gripper can then be raised, pivoted or moved linearly in a known way together with the component 12. When the vacuum is switched off, the sucking element 13 automatically moves back due to the expanding compression spring 14. This operation can be accelerated if a brief blowing pulse is introduced to the vacuum duct 5 from a feed.

Figure 1A:
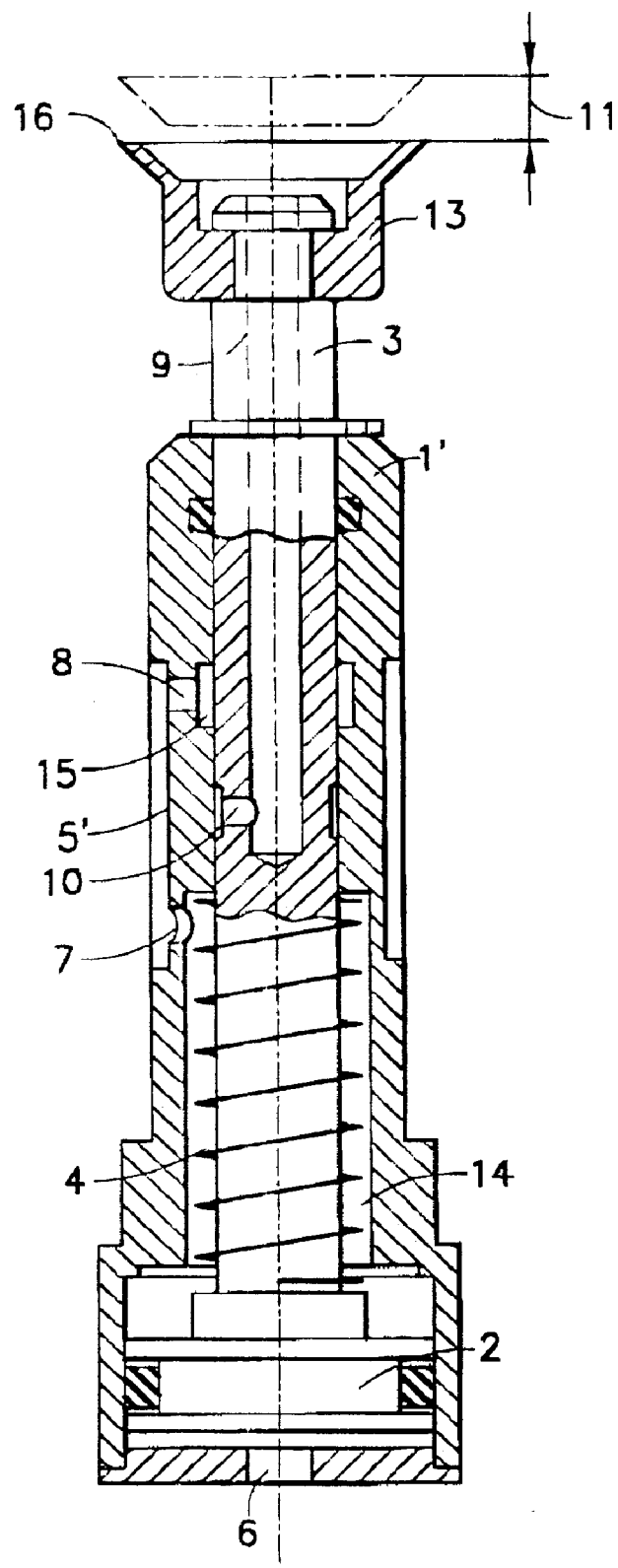
FIG. 1a is a view as in FIG. 1 with the vacuum duct in the wall of the cylinder housing.

An exemplary embodiment was described in more detail in order to explain the invention. It is also possible, in order to minimize the overall size even further, to embed the vacuum duct 5' into the wall of the cylinder housing 1' as shown in FIG. 1a.

The sealing edge 16 may also be designed in such a way that even articles 12 to be moved having a spherical surface can be suctioned effectively.

Due to the pronounced reduction in the overall size of the suction gripper, it is thus possible, for the first time, to arrange a multiplicity of suction grippers next to one another or one behind the other in a fixed-cycle line for small components.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. A suction gripper, comprising:
   a cylinder housing having a first end and a second end, the cylinder housing further having an orifice at the first end, a first passage bore and a second passage bore, the passage bores running radially from an exterior of the cylinder housing to an interior of the cylinder housing;
   a piston rod movably arranged inside the cylinder housing so as to be capable of moving along a longitudinal axis of the cylinder and executing a suction stroke, the piston rod and the cylinder housing defining a cylinder space, the piston rod having a central bore running along a longitudinal axis of the piston rod, and a radial bore running radially inside the piston rod in communication with the central bore and the cylinder space;
   a piston arranged at a base of the piston rod so as to be capable of covering the orifice;
   a compression spring arranged in the cylinder space for pre-stressing the piston on the orifice;
   a vacuum duct in communication with the first passage bore and the cylinder space; and
   a suction element comprising a sealing edge being operably arranged at a projecting end of the piston rod and capable of being in contact with the central bore of the piston rod, whereby in a first stroke position the piston bears against the orifice, the radial bore is closed by the cylinder housing and there is no connection between the central bore and the vacuum duct, and in a second stroke position a vacuum is supplied to the vacuum duct forming a connection between the vacuum duct, the second passage bore and the radial bore.

2. The suction gripper according to claim 1, wherein the second passage bore comprises a control edge configured to lead the vacuum from the second passage bore to the central bore in the piston rod.

3. The suction gripper according to claim 2, wherein the vacuum duct is in a wall of the cylinder housing.

4. The suction gripper according to claim 2, further comprising:
   a transport device capable of moving a component, the vacuum duct being located in the transport device and the cylinder housing being arranged in the transport device.

5. The suction gripper according to claim 1, further comprising:
   a feed arranged at the vacuum duct so as to be capable of providing a blowing pulse to the cylinder.

* * * * *